(12) United States Patent
Ghanea-Hercock

(10) Patent No.: US 7,418,736 B2
(45) Date of Patent: Aug. 26, 2008

(54) NETWORK SECURITY SYSTEM

(75) Inventor: Robert A Ghanea-Hercock, Ipswich (GB)

(73) Assignee: British Telecommunications PLC, London (GB)

( * ) Notice: Subject to any disclaimer, the term of this patent is extended or adjusted under 35 U.S.C. 154(b) by 652 days.

(21) Appl. No.: 10/507,597

(22) PCT Filed: Mar. 21, 2003

(86) PCT No.: PCT/GB03/01212

§ 371 (c)(1),
(2), (4) Date: Sep. 14, 2004

(87) PCT Pub. No.: WO03/084168

PCT Pub. Date: Oct. 9, 2003

(65) Prior Publication Data

US 2005/0188217 A1 Aug. 25, 2005

(30) Foreign Application Priority Data

Mar. 27, 2002 (EP) .................................. 02252218
Jan. 10, 2003 (GB) .................................. 0300581.6

(51) Int. Cl.
*H04L 9/14* (2006.01)
(52) U.S. Cl. .............................. 726/28; 726/4; 726/10; 713/171; 713/182; 380/47; 380/286
(58) Field of Classification Search ........................ 726/4, 726/10, 28; 713/171, 182; 380/47, 286
See application file for complete search history.

(56) References Cited

FOREIGN PATENT DOCUMENTS

EP 0580350 A1 1/1994

OTHER PUBLICATIONS

R. Filman et al., Communicating Security Agents, Proceedings of WET ICE '96, IEEE 1996, pp. 86-91.*
L. Kagal et al., A Framework for Distributed Trust Management, Proceedings of the IJACI-01 Workshop on Autonomy, Delegation and Control. 2001.*

(Continued)

*Primary Examiner*—Emmanuel L Moise
*Assistant Examiner*—Paul Callahan
(74) *Attorney, Agent, or Firm*—Nixon & Vanderhye PC

(57) ABSTRACT

Security is provided in a network system. A message is received from a user, which message requires authentication of the user. An authentication message is sent indicating the identity of the user to an initial software security agent. The software security agent, on receipt of the authentication message, determines whether information relating to the user is stored on a security database associated with the software security agent, and, if so, the software security agent adds an authentication key to the authentication message. The authentication message is sent on to one or more further software security agents. The prior noted steps are repeated with the further software security agent(s) and, if user-related stored security information is found, adding an authentication key to the authentication message and sending the authentication message on to one or more further software security agents until the number of keys associated with the authentication message equals a predetermined number N. When the number of associated keys equals N, the authentication message is sent to the initial software security agent which then grants the required permission to the user.

12 Claims, 4 Drawing Sheets

OTHER PUBLICATIONS

Kong et al., "Providing Robust and Ubiquitous Security Support for Mobile Ad-Hoc Networks", 2001, IEEE, pp. 251-260, XP002211338.

Gong, Increasing Availability and Security of an Authentication Service, IEEE Journal on Selected Areas in Communications, vol. 11, pp. 657662, 1993, No. 5.

Korba, "Security System for Wireless Local Area Networks", 1998 IEEE, pp. 1550-1554.

Deswarte et al., "Intrusion Tolerance in Distributed Computing Systems", 1991 IEEE, pp. 110-121.

* cited by examiner

NETWORK SECURITY SYSTEM

This application is the U.S. national phase of international application PCT/GB03/01212 filed 21 Mar. 2003 which designated the U.S. and claims benefit of EP 02252218.9 and GB 0300581.6, dated 27 Mar. 2002 and 10 Jan. 2003, respectively, the entire content of which is hereby incorporated by reference.

BACKGROUND

1. Technical Field

This invention relates to the field of network security and in particular networked user authentication systems.

2. Related Art

One industry standard for achieving strong user authentication to network services is the Kerberos system, as described in Miller S. P., Neuman B. C., Schiller J. I., & Salitzer J. H. "Kerberos Authentication and Authorisation System", M.I.T Project Athena, Cambridge, Mass., December 1987. Kerberos uses a trusted third-party authentication service in which each client trusts the Kerberos central server to authenticate other clients. Timestamps are used on each client-server communication to prevent or at least reduce the chance of a replay attack.

The Kerberos server maintains a database of its clients and their private keys and an encrypted password for users. Any network services or clients requiring authentication must register with the Kerberos server. The private keys are then negotiated at registration. Kerberos can also provide secure session management based on session keys. The Kerberos system has proven to be a useful authentication platform but suffers from the need for a single centralised server, which is frequently the target of attacks, since access gives full control of a network. It also requires expert administration for its maintenance.

Some preliminary agent based work in this field has already demonstrated the effectiveness of agent managed security methods, although primarily in the area of intrusion detection, (e.g. Filman R., and Linden T., "Communicating Security Agents", Proc. WET ICE 1996, Yialelis, Lupo & Sloman 1996, Balasubramaniyan J., Jose Omar Garcia-Fernandez, Spafford E., and Zamboni D. "An Architecture for Intrusion Detection using Autonomous Agents", Department of Computer Sciences, Purdue University; Coast TR 98-05; 1998). In particular work by Heirlier G. G., Wong J. S., Honavar V., and Miller L. "Intelligent agents for intrusion detection". In Proceedings, IEEE Information Technology Conference, pages 121-124, Syracuse, N.Y., September 1998, demonstrated a multi-agent network defence system in which software agents monitor low-level network activity and report it to higher-level software agents for analysis.

In the system proposed by Crosbie and Spafford (1995) (Crosbie M. and Spafford E. "Defending a Computer System using Autonomous Agents", In 18th National Information Systems Security Conference, October 1995), a similar distributed set of agents monitors network traffic and machine activity, including CPU utilisation. Their system also has agents exchanging anomaly reports between each other and decisions to raise an intrusion alert are based on the combined evidence from a number of agents. This system also utilises a form of machine learning based on Genetic Programs in order to recognise new patterns of attack. Work by Carver et al (2000) (Carver C. A., Hill J. M., Surdu J. R., and Pooch U. W., "A Methodology for using Intelligent Agents to provide Automated Intrusion Response," IEEE Systems, Man, and Cybernetics Information Assurance and Security Workshop, West Point, N.Y., Jun. 6-7 2000, pp. 110-116), demonstrates the use of a distributed heterogeneous group of agents as an IDS solution. The focus is on dynamic and adaptive response to varying levels of security threats.

Qi He and Sycara K. P. and Zhongmin Su, "*A Solution to Open Standard of PKI*", book, Australasian Conference on Information Security and Privacy, pages 99-110, 1998 demonstrates the use of encrypted KQML message exchange among a networked group of agents, which is used as a secure PKI (Public Key Infrastructure) certificate management scheme.

One commercial system, which utilises a similar web and agent based authentication method is the 'ProviderTrust' Web Access system from seqID Ltd. This is a single agent system, designed to provide authentication within a single Intranet domain. Rothke B., "Security Strategies for E-Companies, an insiders view", Information & Security Magazine, October 2001, describes another security system.

In summary, existing systems suffer from several failings, e.g. centrally based key management, which is a potential target for malicious attacks; limited scalability, due to centralised processing of the user database; high operational cost due to the frequent manual intervention required, to reset passwords, and revoke or issue digital certificates.

BRIEF SUMMARY

In accordance with an exemplary embodiment of the invention there is provided a method of providing security in a network system, the method comprising:

receiving a message from a user, which message requires authentication of the user.

sending an authentication message indicating the identity of the user to an initial software security agent, the software security agent, on receipt of the authentication message, determining whether information relating to the user is stored on a security database associated with the software security agent, and, if so, the software security agent adding an authentication key to the authentication message, sending the authentication message on to one or more further software security agents.

repeating the steps of determining whether information related to the user is stored on a security database associated with the further software security agent(s) and, if so, adding an authentication key to the authentication message until the number of keys associated with the authentication message equals a predetermined number, when the number of associated keys associated with the authentication message equals a predetermined number, sending the authentication message to the initial software security agent which then grants the required permission to the user.

The exemplary system automates several key network security tasks such as password issuing, authentication, certificate and key management. In particular the agents can monitor and maintain a valid distributed database of digital certificates and associated public/private key pairs.

Advantageously, linking together the sensory and intelligence capabilities of a large number of agents distributed across a network amplifies the ability of the network to determine the trustworthiness of users and increases the systems resistance to attacks. This arrangement is ideally suited for security services within peer to peer and ad-hoc networks.

In contrast to existing systems the exemplary system is a fully distributed and scalable system.

The system also minimises the manual administration required by the use of the agents' inferencing and reasoning functionality, i.e. an agent can select to increase a user's trust rating if it acquires new knowledge of their creditability.

The agents may engage in a text (or voice) dialogue with a user during the authentication process. Hence the agent could query the user for a set of information which would assist in deciding whether to grant authorised access.

This process would be an extension of the current web practice of asking for place of birth or other personal pre-registered details during a logon process.

The message received from the user may be, for example, a message requiring the issuance of a password, authentication, certificate and/or key management.

The initial software security agent may insert a field into the authentication message indicating the predetermined number of keys required for the authentication message.

Once the authentication message has been reviewed by a predetermined number of software security agents and the number of keys associated with the authentication message does not equal the predetermined number, the current software security agent may return the message to the initial software security agent which then presents the user with a denial message.

Preferably a security database is associated with each software security agent, distributed around the network.

A central message database may be provided which stores messages for software security agents for subsequent provision to the software security agent.

In a second aspect of the invention there is provided a network security system comprising a port for receiving from a user a message which requires authentication of the user, a server for transmitting the message to an initial software security agent, which software security agent has associated with it a security database comprising information relating to users authenticated with the software security agent, the software security agent being arranged to determine whether information relating to the user is stored on the security database associated with the software security agent and, if so, to add an authentication key to the authentication message, a plurality of further software security agents, the initial software security agent being arranged to send the authentication message on to one or more further software security agents, on receipt of an authentication message, the further software security agent(s) being arranged to carry out the steps of determining whether information relating to the user is stored on a security database associated with the software security agent and if so to add a key to the authentication message, the software security agents being arranged to repeat the steps of determining whether information relating to the user is stored on the security database associated with the software security agent and, if so to add the authentication key to the authentication message until the number of keys associated with the authentication message equals a predetermined number, the software security agent being arranged to send the authentication message to the initial software security agent when the number of keys associated with the authentication message equals the predetermined number, the initial software security agent being arranged to then grant the required permission to the user.

Preferably the software security agents and their associated security databases are distributed throughout a network.

BRIEF DESCRIPTION OF THE DRAWINGS

The invention will now be described by way of example only with reference to the accompanying drawings in which.

DETAILED DESCRIPTION OF EXEMPLARY EMBODIMENTS

Figure 1:
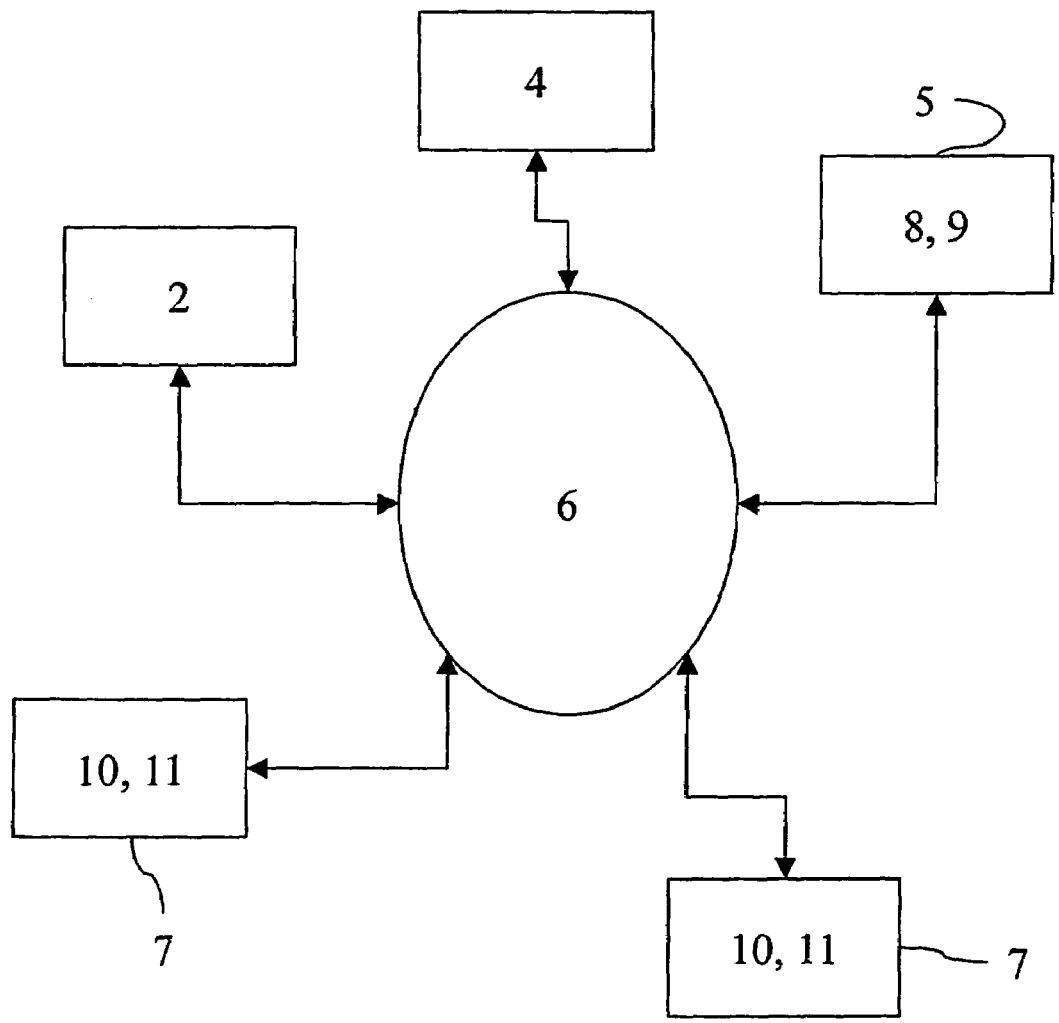
FIG. 1 shows an example of a network security system.

FIG. 1 shows an example of a network security system. A user 2 is connected to a server 4 via a network 6. The server 2 is the gateway for the user to a secured service e.g. an on-line shopping service. Associated with the server 4 is a main software security node 5, incorporating an initial software security agent 8 and its associated security database 9. Also associated with the server 4 are one or more software security nodes 7, each incorporating further software security agents 10 and their associated security databases 11. As is clear from FIG. 1, the software security agents and their associated security databases may be distributed about the network 6. Each server 4 and node 5, 7 maintains a dynamic list of available peers and periodically exchanges this list with neighbouring nodes. When a new user is logged on to a system provided by the server 4, the initial software agent 8 of the main security service node 5 creates a new secure user object and writes this object to the object database 9.

Figure 2:
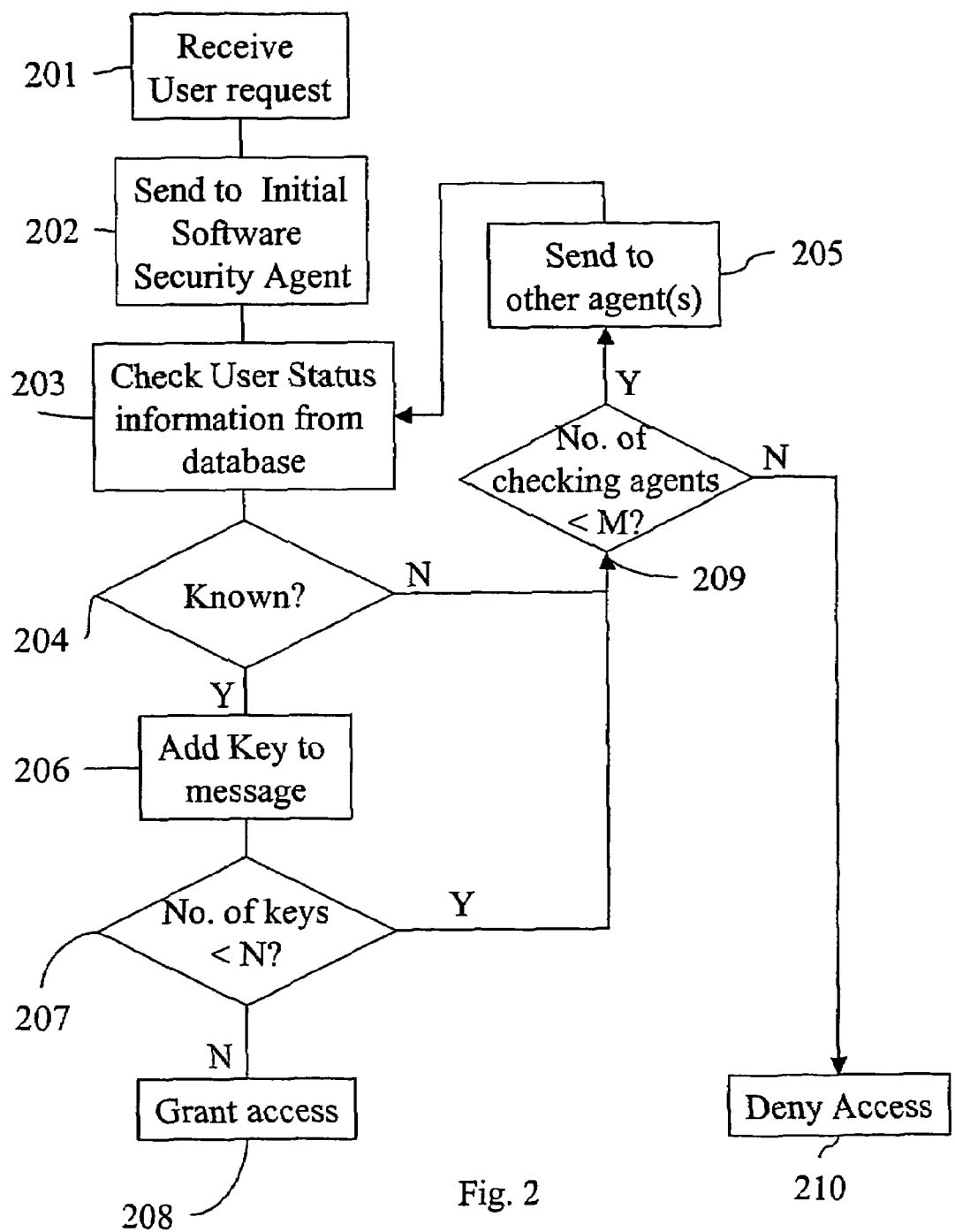
FIG. 2 is a flow diagram illustrating steps of the invention.

Issuing digital certificates is easy, managing their life cycle, i.e. revoking or reissuing and associating them to the proper user or service is vastly more difficult. Hence one of the central concepts of the invention is that a network of software agents should control all user authentication requests, password control and PKI (Public Key Infrastructure) management. As an example we will step through a typical user-agent interaction with reference to FIG. 2. It is optional whether the user is aware of the agent's existence, although we will also consider the issue of user-agent dialogue as part of the authentication process.

EXAMPLE TASK

A User Requests a New Login Password for a Remote Database

A user first logins in via a browser interface and submits some preliminary identification, (e.g. user id and employee number). The request is passed (201) via an SSL http link to a local secure web server 4, which routes the message (202) to a suitable local agent. All communications occur over encrypted SSL channels, even local host communications.

On receiving the user's request the agent first converts the request into an ACL message format and fires its reasoning module to process the request. In this case the user must be validated as having the necessary clearance to access the requested resource. The agent first passes (203) the user's details to its own security service module, which returns the user's current status, i.e. authorised, not-authorised, untrustworthy, or malicious. If the user is simply not known (204) as authorised by the agent it transmits (205) the request to another agent in the network (or more than one agent in a multicast message).

The receiving agent(s) again attempt to validate the authority and identity of the sending agent and then check (203) the user request against their local database of authorised users. If authorisation is granted the agent adds (206) a suitable certificate/key to the original message and transmits (205) the new processed request to the next agent (if performed sequentially).

Once a specified number of agents N have authenticated the request (207) the completed message is returned to the initiating agent, which then grants access to the user (208), and assigns the necessary password and certificate details to its own local database of authorised users. The problem of messages flooding the network is resolved by each message containing the number of checks it requires. If the number of checks exceeds this number (209) a denial of access message is presented (210) hence preventing the message from being repeatedly processed.

A failure at any point results in either a denial of access message (210) to the user and/or a message/email being sent to the system administrator. By simply increasing the number of agents N required to authenticate a user the degree of security can be considerably increased.

The security of the system is therefore dependent on N trusted machines. Hence while any hostile attack may compromise one or more machines, it should be unable to achieve control over all of the machines. (Obviously a distributed denial of service (DDOS) attack can cripple a large number of machines simultaneously, which means the identity of the agents' host servers should be shielded). In particular the use of distributed agents makes it difficult for a hostile user to access the runtime code for all of the agents. Since an attacker can only communicate via the established message channels with the agents, the agent can then interpret each message and apply whatever security checks they wish. In addition, simple updates to the agents' rule set can allow even more complex cross checking and referring of a user to be performed. (Of course access to the agents reasoning system and rules needs to be tightly administered.) The following points summarise the design objectives:

Autonomy—reduced human intervention required

Flexibility—an administrator can remotely load the agents with new scripts/rules of access.

Security—the system is highly secure, requiring N servers to be compromised and the agent's code/operation modified to break the system. (Importantly, small increases in N allow large increases in the degree of authentication/security).

Scalability—since the agents manage the communication between each other (and would normally use a sequential message to process requests), the system should scale to large networks.

The invention therefore provides a scalable, modular, and highly robust architecture. If required a number of the agent host machines could also be sited behind firewalled servers or heavily protected machines.

Architecture

The preferred embodiment of the invention is implemented using the FIPA JADE agent toolkit as the basis for the agent components, which provides core messaging and agent visualisation services, e.g. JADE 2.3. JADE was selected as it offers a lightweight Java agent toolkit with good FIPA Agent Communication Language (ACL) compliance. Once loaded, the JADE container allows full administrative GUI access to visualise agent messages or inspect the agents' state. The agent on each host also occupies an acceptable level of local resources, achieved via a lightweight modular design.

A middleware layer of Java peer-to-peer http servers is used as the basis for connecting services to the network. Each agent resides on a single host machine and controls the GUI interface to the user, which offers initial password dialogues and html forms.

GUI Management

The user interface is an html form, which allows the user to input their current security identification data. Access to this form is controlled by a standard URL password access panel, which provides a first line of access control. The response data from the agent is returned to a second html page, which provides links to specific resources the user has been granted access to.

Messaging Service

The system enables support for security services within peer to peer (P2P) and ad-hoc networks. To enable this the whole system utilises a P2P messaging layer based on a network of autonomous web servers. These servers are lightweight Java http servers, which automatically maintain links with any available peer nodes across the network. The use of http allows firewall-tunnelling to link nodes at multiple sites or separate Intranet domains. Each server/node maintains a dynamic list of available peers and periodically exchanges this list with neighbouring nodes as described in Minar N., http://www.openp2p.com/pub/a/p2p/2001/12/14/topologies one.html "Distributed Systems Topologies", 2001. The key advantage of this architecture is to make the system highly robust to failure of individual nodes. Hence when a user logins on to the system they have guaranteed service availability. This P2P architecture is also a key aspect of the agent to agent communication system, which also requires a highly robust and flexible level of service. Indeed many agent systems have relied on centralised message servers that have hindered scalability and acted as a single point of failure.

Figure 3:
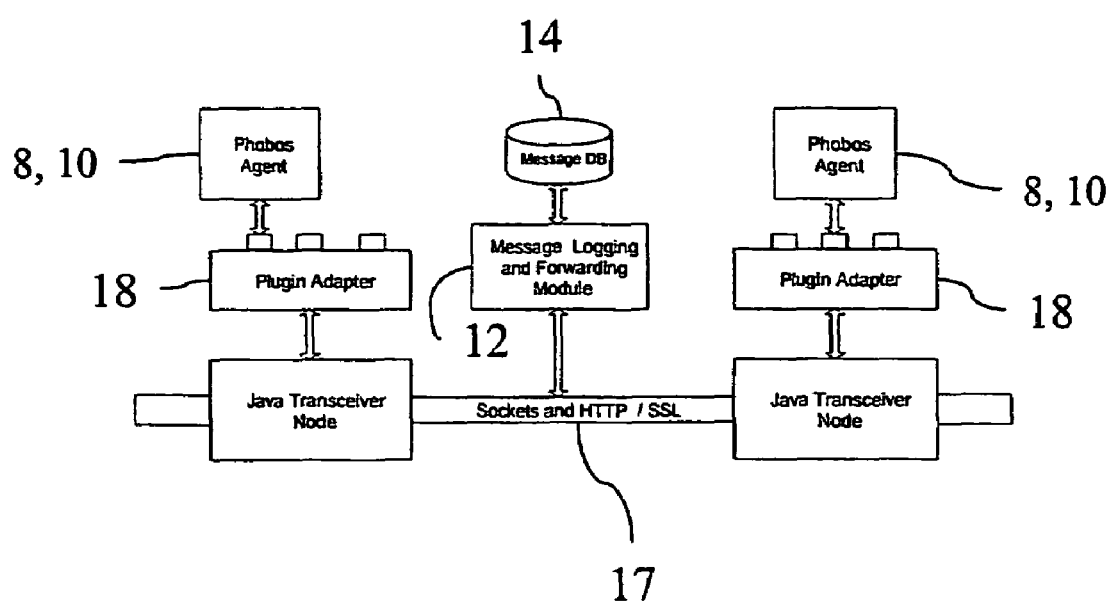
FIG. 3 shows an example of the messaging facility for use with software agents according to the invention.

FIG. 3 is a schematic diagram of how the messaging service of a network according to the invention may be implemented. The messaging layer contains independent code modules 12 which intercept all message traffic and store it in a secure distributed message database 14, to provide store and forward capability. Hence if an agent is offline or busy its messages will be saved and relayed whenever it becomes available. As shown in FIG. 3 the system isolates the agent 8, 10 from the messaging layer 17 via a plug-in module 18, which means that future versions can be easily ported to a different messaging architecture or service.

```
//ACL Message
(REQUEST
    :sender ( agent-identifier   :name
bob@revolve:1099http://132.000.000.000:8082/agentPlugin/receiveData)
    :receiver (set ( agent-identifier   :name
```

```
bob@revolve:1099http://132.000.000.000:8082/agentPlugin/receiveData) )
    :content "User taskObject class : X509 cert :
    rO0ABXNyABNkYXRhYmFzZS51c2VyT2JqZWN0BO4UIvC4rrsCAAdMAAJpZHQAEkxqYXZhL2xhbm
    cvU="
    :reply-with    broadcast
    :in-reply-to   receiver
    :encoding      X509
    :language      FIPA-SL0
    :ontology      agent-security
    :protocol      fipa-request
    :conversation-id   1014975952282
```

Example of an ACL Phobos agent message with X509 certificate data.

Message Handler Component

Each agent 8, 10 contains a multi-threaded message-handling module, which handles all incoming connections. The messaging service maintains multiple SSL socket connections to the plug-in component 18, which links the agent to the underlying messaging service. Internal to the message-handling class separate threads handle each socket, with a buffered message queuing service.

A separate threaded class pops inbound messages from the buffer and passes them to a taskengine module for processing. It also pushes out-bound messages onto the buffered queue for processing by the message-handler classes.

Message Format

The messages are based on the ACL format, which defines basic elements such as sender agent, receiver agent and specify the language and protocols being used. The ACL contentObject element stores a serialisable object which holds the user's request data and security details, i.e. X509 certificate. In addition, if required, the JADE platform provides a local network inter agent communication facility. These local agent messages can be visualised via the JADE management interface. Alternative agent languages (e.g. KQML) may be used.

Task Engine

Figure 4:
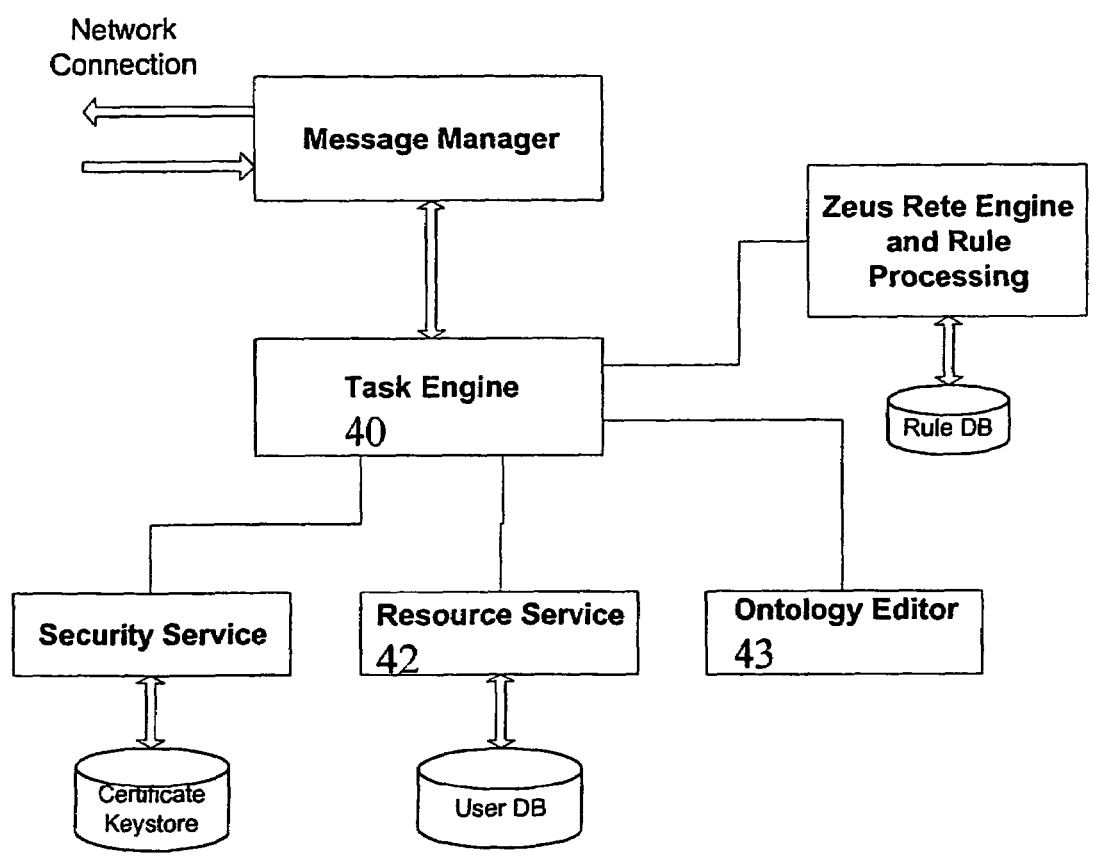
FIG. 4 is an embodiment of a security node according to the invention.

As shown in FIG. 4, in an implementation the task Engine component 40 is based on the inferencing core of the Zeus agent platform. Zeus is an open source multi-agent toolkit, which provides a library of software components and tools that facilitate the rapid design, development and deployment of agent systems. The principal components, which have been utilised from the Zeus platform, are:

- a Co-ordination Engine that makes decisions concerning the agent's goals, e.g. how they should be pursued, when to abandon them, etc. It is also responsible for co-ordinating the agent's interactions with other agents using its known co-ordination protocols and strategies, e.g. various auction protocols or contract net protocols.
- an Acquaintance Database that describes the agent's relationships with other agents in the society, and its beliefs about the capabilities of those agents. The Co-ordination Engine uses information contained in this database when making collaborative arrangements with other agents.
- a Planner and Scheduler that plans the agent's tasks based on decisions taken by the Co-ordination Engine and the resources and task specifications available to the agent.
- a Resource Database 42 that maintains a list of resources (referred to as facts) that are owned by and available to the agent. The Resource Database also supports a direct interface to external systems, which allows it to dynamically link to and utilise proprietary databases.
- an Ontology Database 43 that stores the logical definition of each fact type—its legal attributes, the range of legal values for each attribute, any constraints between attribute values, and any relationships between the attributes of the fact and other facts.
- a Task/Plan Database that provides logical descriptions of planning operators (or tasks) known to the agent.
- an Execution Monitor that maintains the agent's internal clock, and starts, stops and monitors tasks that have been scheduled for execution or termination by the Planner/Scheduler. It also informs the Planner of successful and exceptional terminating conditions of the tasks it is monitoring.

Security Service Component

All of the required security functions are contained within a separate code package. This provides all of the essential security functions requested by the agents, i.e.:

Generate new certificates

Revoke certificates

Check certificates

Encrypt data

Generate public/private key pairs

Validate users authentication details.

When a new user is logged into the system, the security service component creates a new secure user object and writes this to an object database. This object contains a digitally signed X.509 certificate, a new strong password, and any requests the user has made. The security service component also provides separate GUI components to allow administrative control of the certificates held in its keystore.

This component is also available to any resource applications which are plugged in to the messaging network, and can be used to authenticate users making access requests to those resources. It also enables agents to perform security checks on other agents in the system by validating the certificates presented by the agent whenever it initiates a new communication with another agent.

Resource Services

The target services for the system may be any suitable distributed or web based service, which requires strong user authentication, e.g. a web based computer shopping database accessed via a Java servlet interface. The servlet utilises an instance of the security module in the system to perform basic user authentication and security checks. The service may either access a remote copy of the authorised user database (i.e. one maintained by the agent network) or a local replicated copy. The servlet uses the Tomcat platform 3.2.3, which provides a stable and easy to install servlet engine.

Databases

The database component contains generic code to access two separate databases. The first is a full SQL Microsoft mdb format database, which uses local JDBMS drivers. This holds the product catalogue used by the shopping catalogue servlet. A second mdb database holds the messages generated between any plug-ins or agents. In addition a flat file object database is used to contain serialised Java user objects. An XML based relational database model is also suitable.

An agent may be allowed to develop a specialisation by role of the agent, such that agents can become expert at particular aspects of system security or authentication, e.g. gathering background data on user's trust status.

The message format may also incorporate improved SOAP XML integration to allow smooth interaction with standard web services. It would clearly be useful if the agents could query alternative online data sources to acquire data on a users history and level of trust granted by other organisations or systems, for example by performing credit checks or looking up career history, if relevant.

A further advantage of this design is that plugging custom components into the underlying P2P message layer can easily extend the system. This can then provide additional security functions for the agents. For example, intrusion detection systems, network and resource monitoring, and monitoring of the user once they are granted access. Such a process also enables an integrated security policy to be implemented, with the network defence systems able to communicate automatically with the user authentication agents.

The invention has particular application in high security networks or large scale intranets. The invention may be used to provide authentication services to any networked application. For example, the system could authenticate and manage other classes of agent which are performing another service, or separate software applications which require public key infrastructure management services.

For example in a business e-commerce web service the backend web server may make calls to a network according to the invention in order to acquire security services.

The system may be arranged to enable a software agent to provide security and authentication services to an individual user. In this mode the agent assumes the role of protecting the user's digital assets during all forms of information transactions, for example during online purchases.

As an example, users (even experts) are unable to easily validate the real trust level of digital certificates presented during online transactions by web servers. They normally accept a presented certificate as valid. Similarly it is difficult for human users to check the standard of encryption or authentication protocols being used by an online e-commerce service or web site. Often an increase in the complexity or scope of secure applications leads to a reduced level of system integrity as user errors leads to new security violations.

When used to support an individual user, the agent may perform a number of services, such as:

i. Secure a set of data on the users computer.
ii. Secure a set of data held on a remote server.
iii. Secure an electronic data communication. (Extensions to the application could include securing of voice channels).
iv. Test the security and or trust status of a remote computer or service.
v. Establish the trustworthiness/security status of another human user.

It will be understood by those skilled in the art that the apparatus that embodies the invention could be a general purpose device (or group of devices) having software arranged to provide an embodiment of the invention. Furthermore, any or all of the software used to implement the invention can be contained on various storage mediums such as a floppy disc, CD-ROM, or magnetic tape so that the program(s) can be loaded onto one or more general purpose devices, or could be downloaded over a network.

What is claimed is:

1. A method of providing security in a network system, the method comprising:
   receiving a message from a user, which message requires authentication of the user,
   sending an authentication message indicating the identity of the user to an initial software security agent, the software security agent, on receipt of the authentication message, determining whether information relating to the user is stored on a security database associated with the software security agent, and, if so, the software security agent adding an authentication key to the authentication message,
   sending the authentication message on to one or more further software security agents,
   repeating the steps of determining whether information related to the user is stored on a security database associated with the further software security agent (s) and, if so, adding an authentication key to the authentication message and sending the authentication message on to one or more further software security agents until the number of keys associated with the authentication message equals a predetermined number,
   when the number of associated keys associated with the authentication message equals a predetermined number, sending the authentication message to the initial software security agent which then grants the required permission to the user.

2. A method according to claim 1 in which the message received from the user is a message requiring the issuance of one or more of: (a) a password, (b) authentication, (c) certificate and/or (d) key management.

3. A method according to claim 1 in which the initial software security agent communicates with the user via a text or voice message.

4. A method according to claim 3 wherein the text or voice message requests additional information from the user.

5. A method according to claim 1 wherein the initial software security agent inserts a field into the authentication message indicating the predetermined number of keys required for the authentication message.

6. A method according to claim 1 wherein, when the authentication message has been reviewed by a predetermined number of software security agents and the number of keys associated with the authentication message does not equal the predetermined number, the current software security agent returns the message to the initial software security agent which then presents the user with a denial message.

7. A method according to claim 1 wherein a security database is associated with each software security agent.

8. A method according to claim 1 wherein a central message database stores messages for software security agents for subsequent provision to the software security agent.

9. A computer readable media containing a computer program comprising processor implementable instructions for causing one or more processors to perform the method according to claim 1 when the instructions are executed by the processor or processors.

10. A storage medium storing computer readable code representing processor implementable instructions for causing one or more processors to perform the method according to claim 1 when the instructions are executed by the processor or processors.

11. A network security system comprising:
- a port for receiving from a user a message which requires authentication of the user,
- a server for transmitting the message to an initial software security agent, which software security agent has associated with it a security database comprising information relating to users authenticated with the software security agent,
- the software security agent being arranged to determine whether information relating to the user is stored on the security database associated with the software security agent and, if so, to add an authentication key to the authentication message,
- a plurality of further software security agents, the initial software security agent being arranged to send the authentication message on to one or more further software security agents,
- the software security agents being arranged to carry out the steps of determining whether information relating to the user is stored on the security database associated with the software security agent and, if so to add the authentication key to the authentication message and to send the authentication message on to one or more further software security agents until the number of keys associated with the authentication message equals a predetermined number,
- the software security agents being arranged to send the authentication message to the initial software security agent when the number of keys associated with the authentication message equals the predetermined number, the initial software security agent being arranged to then grant the required permission to the user.

12. A system according to claim 11 wherein the software security agents and their associated security databases are distributed throughout a network.

\* \* \* \* \*